Patented May 25, 1937

2,081,168

UNITED STATES PATENT OFFICE 2,081,168

METHOD OF PREVENTING SCALE DEPOSITIONS AND REMOVING SUCH DEPOSITS FROM METALLIC SURFACES

Boris S. de Mering, Houston, Tex., assignor to Standard Oil Development Company, a corporation of Delaware No Drawing. Application May 2, 1932, Serial No. 608,863

4 Claims. (Cl. 87—27)

This invention relates to improvements in scale and corrosion preventives and scale removing compositions especially adapted for use in water jackets of engines, in storage tanks, in pipe lines, etc.

In its preferred form the invention comprises an aqueous solution of a composition including ammonia and purified sludge recovered from the treatment of petroleum oils with concentrated sulphuric acid. There is formed by the treatment of mineral oils such as lubricating oils, with large quantities of concentrated sulphuric acid, an acid or group of acids and other materials which separate out in an acid sludge layer.

The sludge layer is purified by removing the oil and sulphuric acid as follows: The sludge resulting from the concentrated sulphuric acid treatment of mineral oils after separating from the oil layer is first washed with a medium heavy petroleum distillate. This removes a considerable portion of the oil.

The remaining sludge is diluted with water sufficient to form two layers after agitation with steam. The mixture after being thoroughly agitated with steam is allowed to settle and stratify, and the water layer containing the major portion of the sulphuric acid present in the sludge is removed. The sludge layer is extracted with naphtha for removal of the remaining oil.

The separated sludge layer containing the sludge acids and other materials is now suitable for use in our compositions. The following composition is given for illustration.

A quantity of the sludge layer, separated as described, containing about 20 to 35% of sludge acids, is dissolved in an equal quantity of water and ammonia is added slowly with constant stirring. The quantity of ammonia added is sufficient to neutralize the sludge acids present and a slight excess is not detrimental.

In treating water used in the water jackets of engines, ammonia-neutralized sludge is introduced either into the cooling tower reservoir or into the hot well, daily or weekly, in varying amounts depending on the water to be treated. If too much ammonia-neutralized sludge is added, an excessive foaming results and this foaming is a measure of the amount required for treating. A preliminary test of the water may be used as a guide to the amount of ammonia-neutralized sludge required to treat a definite quantity of water. A measured quantity of water is taken and measured amounts of ammonia-neutralized sludge are slowly added while constantly stirring the water until foaming of the mixture results. The largest proportion of ammonia-neutralized sludge that may be added without foaming is used.

Oil stock tanks and pipe lines, natural gasoline plant equipment, etc., are also protected from the corrosive action of hydrogen sulphide and other deleterious compounds by coating both inside and outside with this composition. It is insoluble in oil and is not dissolved from the walls of the containers and pipes forming an effective protection for the surface.

The composition likewise prevents scale formation in water containers such as radiators of automobiles, condensers, etc., when added to the water circulating system.

The foregoing description is merely illustrative and various changes and alternative arrangements may be made within the scope of the appended claims in which it is my intention to claim all novelty inherent in the invention as broadly as the prior art permits.

I claim:

1. The method of preventing scale depositions and removing such deposits from metallic surfaces which comprises subjecting the surface to the action of an aqueous solution of an ammonium salt of a water soluble sulfonic acid resulting from the treatment of petroleum with concentrated sulfuric acid, said aqueous solution being substantially free from oil and from free acids and containing a sufficient amount of said salt to prevent scale deposition on and to remove such deposits from metallic surfaces.

2. The method of preventing scale depositions and removing such deposits from metallic surfaces, which comprises subjecting the surface to the action of an aqueous solution of ammonium salt of water soluble sulfonic acid resulting from the treatment of petroleum with concentrated sulfuric acid, said aqueous solution being substantially free from oil and from acids and containing a slight excess of ammonia, the sulfonic acid salt also being in the largest proportion permissible without foaming.

3. The method of preventing scale formation and removing scale deposits from the water jacket of an engine which comprises adding to the water circulated through said jacket an ammonium salt of a water soluble sulfonic acid resulting from the treatment of petroleum with concentrated sulfuric acid, the resulting solution being substantially free from oil and from free acids and in the largest proportion permissible without foaming.

4. Process according to claim 3 in which the solution contains from about 10 to 17½% of the ammonium salt.

BORIS S. DE MERING.